US012798403B2

(12) United States Patent
Hoshino et al.

(10) Patent No.: US 12,798,403 B2
(45) Date of Patent: Nov. 17, 2026

(54) WORK VEHICLE

(71) Applicant: Komatsu Ltd., Tokyo (JP)

(72) Inventors: Yuta Hoshino, Tokyo (JP); Koji Obata, Tokyo (JP); Shota Yamawaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 309 days.

(21) Appl. No.: 18/691,510

(22) PCT Filed: Sep. 21, 2022

(86) PCT No.: PCT/JP2022/035237

§ 371 (c)(1),
(2) Date: Mar. 13, 2024

(87) PCT Pub. No.: WO2023/074203

PCT Pub. Date: May 4, 2023

(65) Prior Publication Data

US 2024/0399897 A1 Dec. 5, 2024

(30) Foreign Application Priority Data

Oct. 29, 2021 (JP) ................................ 2021-177729

(51) Int. Cl.

| | |
|---|---|
| ***B60L 50/75*** | (2019.01) |
| ***B60K 1/04*** | (2019.01) |
| ***B60K 15/03*** | (2006.01) |
| ***B60L 15/00*** | (2006.01) |
| ***B60L 58/33*** | (2019.01) |

(52) U.S. Cl.

CPC ................ *B60L 50/75* (2019.02); *B60K 1/04* (2013.01); *B60K 15/03* (2013.01); *B60L 15/007* (2013.01); *B60L 58/33* (2019.02); *B60K 2015/03315* (2013.01); *B60L 2210/10* (2013.01)

(58) Field of Classification Search

CPC .......... B60L 50/75; B60L 50/71; B60L 50/72; B60L 2210/10; B60K 1/04; B60K 15/03; B60K 15/007

See application file for complete search history.

(56) References Cited

U.S. PATENT DOCUMENTS 6,874,588 B2 * 4/2005 Kato ...................... B60L 1/003 429/442
2005/0224265 A1 * 10/2005 Mizuno ................ B60L 3/0092 280/834

(Continued)

FOREIGN PATENT DOCUMENTS

CN 113479130 A 10/2021
JP 2004-122972 A 4/2004

(Continued)

*Primary Examiner* — Erez Gurari
(74) *Attorney, Agent, or Firm* — Troutman Pepper Locke LLP; James E. Armstrong, IV; Joshua L. Jones

(57) ABSTRACT

A work vehicle includes a fuel cell, a fuel-cell DCDC converter that adjusts the voltage output from the fuel cell, a battery, a battery DCDC converter that adjusts the voltage output from the battery, and a vehicle body that supports the fuel cell, the fuel-cell DCDC converter, the battery, and the battery DCDC converter. The fuel cell is disposed in the vehicle body in front of the fuel-cell DCDC converter, the battery, and the battery DCDC converter.

5 Claims, 3 Drawing Sheets

(56) References Cited

U.S. PATENT DOCUMENTS

| | | | | |
|---|---|---|---|---|
| 2007/0007060 | A1* | 1/2007 | Ono | B62D 25/025 180/65.31 |
| 2014/0167712 | A1 | 6/2014 | Kim et al. | |
| 2018/0229622 | A1 | 8/2018 | Matsumoto | |
| 2019/0263450 | A1 | 8/2019 | Inoue et al. | |
| 2020/0235411 | A1* | 7/2020 | Naito | H01M 8/2475 |
| 2020/0307396 | A1* | 10/2020 | Ogawa | B60L 50/75 |
| 2021/0005908 | A1* | 1/2021 | Yoshitomi | B60L 58/30 |
| 2021/0155224 | A1 | 5/2021 | McKibben et al. | |
| 2022/0134891 | A1* | 5/2022 | Yanagiura | H01M 8/04776 180/65.1 |
| 2023/0290966 | A1* | 9/2023 | Arya | B60L 1/003 |
| 2023/0311714 | A1* | 10/2023 | Akabori | B60L 50/75 429/444 |
| 2023/0395838 | A1* | 12/2023 | Isoda | H01M 8/2404 |
| 2025/0050750 | A1* | 2/2025 | Watanabe | B60L 50/53 |
| 2025/0115167 | A1* | 4/2025 | Hayashi | B60L 58/33 |
| 2025/0296422 | A1* | 9/2025 | Sakano | B60K 1/04 |
| 2025/0313101 | A1* | 10/2025 | Louis | B60L 58/40 |

FOREIGN PATENT DOCUMENTS

| | | | |
|---|---|---|---|
| JP | 2017-128202 | A | 7/2017 |
| JP | 2019-147500 | A | 9/2019 |
| WO | 2021/064010 | A1 | 4/2021 |

* cited by examiner

WORK VEHICLE

TECHNICAL FIELD

The present invention relates to a work vehicle.

Priority is claimed on Japanese Patent Application No. 2021-177729, filed Oct. 29, 2021, the content of which is incorporated herein by reference.

BACKGROUND ART

Patent Document 1 discloses a work vehicle including a cab provided on an undercarriage, a work machine provided in the undercarriage, an electric motor driving the work machine, and a fuel cell unit generating electric power for driving the electric motor. In Patent Document 1, the fuel cell unit is provided on the undercarriage behind the cab and at the center in a vehicle length direction. The fuel cell unit includes a fuel cell generating electric power with supply of hydrogen and air, a blower supplying air to the fuel cell, and a hydrogen tank storing hydrogen which is supplied to the fuel cell. A DCDC converter is disposed at one of positions adjacent to the fuel cell in a vehicle width direction, and the blower is disposed at the other.

Patent Document 2 discloses a fuel-cell vehicle including a fuel cell stack, a hydrogen tank, and a secondary battery mounted on a vehicle body frame. In Patent Document 2, the fuel cell stack, the hydrogen tank, and the secondary battery are sequentially disposed from a vehicle-body forward side.

RELATED ART DOCUMENT

Patent Document

[Patent Document 1]
Japanese Unexamined Patent Application, First Publication No. 2017-128202
[Patent Document 2]
Japanese Unexamined Patent Application, First Publication No. 2019-147500

SUMMARY

Problems to be Solved by the Invention

On the other hand, devices mounted in a vehicle including a fuel cell (hereinafter also referred to as an "FC vehicle") are much different from those mounted in a vehicle including an engine (hereinafter also referred to as an "engine vehicle") according to the related art. For example, since fuel of an engine vehicle is diesel, a fuel tank fully filled is heavy. On the other hand, since fuel of an FC vehicle is hydrogen, a hydrogen tank fully filled is light. Furthermore, a large number of batteries and DCDC converters which are heavy and unnecessary for an engine vehicle need to be mounted in an FC vehicle. In this way, since devices mounted in an FC vehicle are much different from those mounted in an engine vehicle, weights of the devices are much different. Accordingly, depending on disposed positions of the devices, there is a likelihood that a longitudinal weight balance of an unloaded vehicle body (a vehicle body on which luggage is not loaded) will become worse and hill-climbing performance on a soft road surface at the time of raining or the like will become worse. For example, when the front is heavier (when the front part in an unloaded state is excessively heavy), there is a high likelihood that traction of rear wheels which are driving wheels will become lower.

Accordingly, there is room for improvement in curbing deterioration of a longitudinal weight balance in an unloaded state.

Therefore, an objective of the present invention is to provide a work vehicle that can curb deterioration of a longitudinal weight balance in an unloaded state.

Solution to Problem

According to an aspect of the present invention, there is provided a work vehicle including: a fuel cell; a fuel-cell DCDC converter that adjusts the voltage output from the fuel cell; a battery; a battery DCDC converter that adjusts the voltage output from the battery; and a vehicle body that supports the fuel cell, the fuel-cell DCDC converter, the battery, and the battery DCDC converter, wherein the fuel cell is disposed in the vehicle body in front of the fuel-cell DCDC converter, the battery, and the battery DCDC converter.

Advantage of the Invention

According to the aspect, it is possible to curb deterioration of a longitudinal weight balance in an unloaded state.

DESCRIPTION OF THE EMBODIMENTS

Hereinafter, an embodiment of the present invention will be described with reference to the accompanying drawings. In the embodiment, a dump truck which is a transportation vehicle running in work sites such as mines and carrying luggage will be exemplified as a work vehicle. For example, a dump truck may be an unmanned dump truck that is driven in an unmanned manner without depending on a driver's driving operation or may be a manned dump truck that is driven on the basis of a driver's driving operation.

<Dump Truck>

Figure 1:
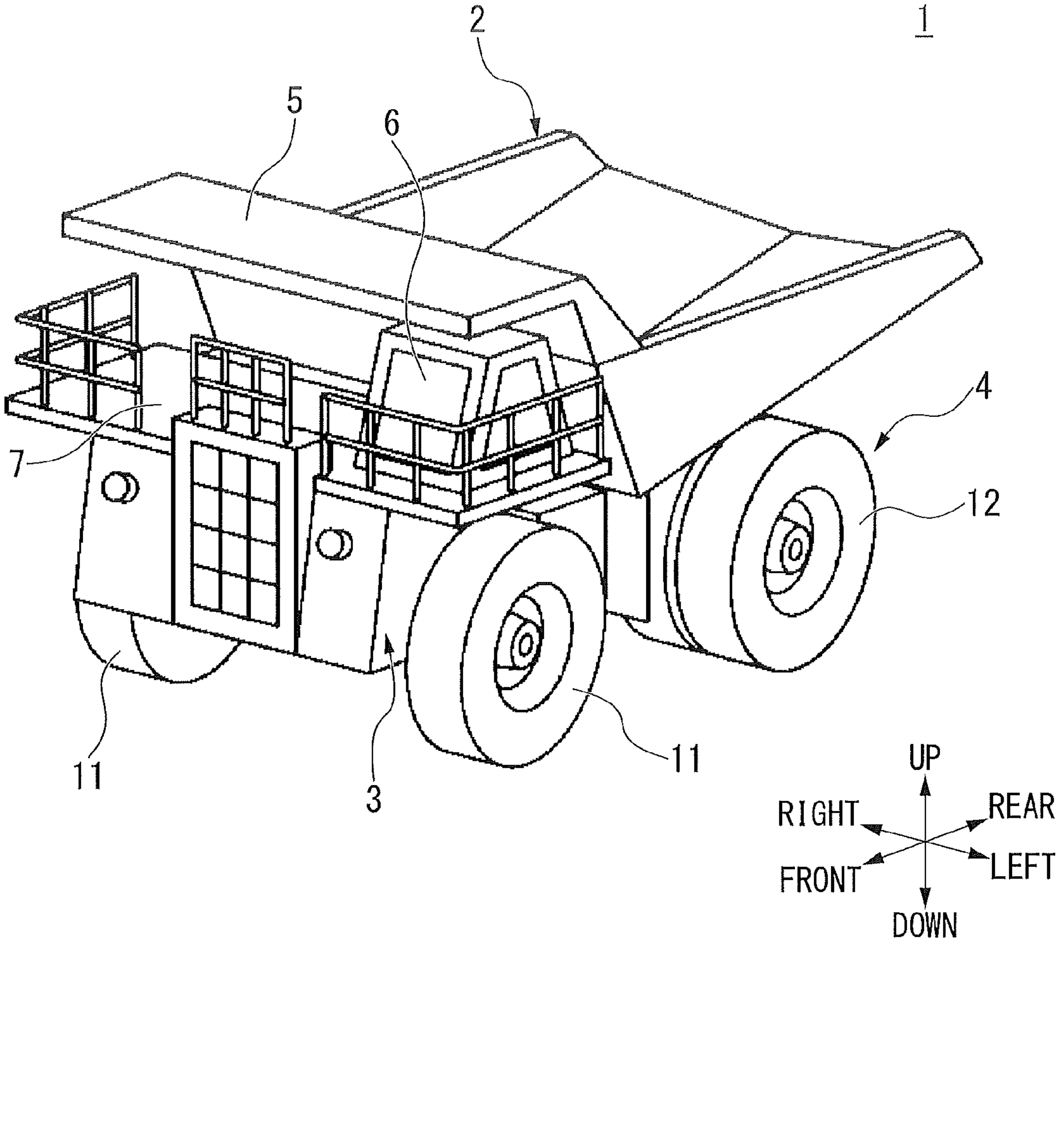
FIG. 1 is a perspective view of a work vehicle according to an embodiment.

As illustrated in FIG. 1, the dump truck 1 includes a dump body 2, a vehicle body 3, and an undercarriage 4. In the following description, a forward movement direction (a vehicle-body forward side), a reverse movement direction (a vehicle-body rearward side), and a vehicle width direction (a vehicle-body lateral direction) of the dump truck 1 are referred to as "a vehicle forward side (one side in a vehicle longitudinal direction)," "a vehicle rearward side (the other side in the vehicle longitudinal direction)," and "a vehicle width direction." The vehicle width direction may be referred to as "leftward (one side in the vehicle width direction)" or "rightward (the other side in the vehicle width direction)." The right side with respect to the forward movement direction of the dump truck 1 is referred to as rightward, and the left side with respect to the forward movement direction of the dump truck 1 is referred to as leftward. A vehicle vertical direction (a vehicle-body vertical direction), a vehicle upward side (a vehicle-body upward side), and a vehicle downward side (a vehicle-body downward side) of the dump truck 1 are simply referred to as "vertically," "upward," and "downward." In the example illustrated in the drawing, the dump truck 1 is placed on a horizontal plane. The vehicle vertical direction (the vehicle-body vertical direction), the vehicle upward side (the vehicle-body upward side), and the vehicle downward side (the vehicle-body downward side) of the dump truck 1 match a vertical direction, upward, and downward in a state in which the dump truck 1 is placed on a horizontal plane.

The dump body 2 is a member on which luggage is loaded. At least a part of the dump body 2 is disposed above the vehicle body 3. The dump body 2 can perform a dump operation and a lowering operation.

Here, the dumping operation is an operation of separating the dump body 2 from the vehicle body 3 to be tilted in a dumping direction. The dumping direction is on the rearward side in the vehicle body 3. In the embodiment, the dumping operation includes raising a front-end part of the dump body 2 and tilting the dump body 2 rearward. A loading surface of the dump body 2 is tilted rearward and downward through the dumping operation.

The lowering operation is an operation of causing the dump body 2 to approach the vehicle body 3. The lowering operation is an operation in a reverse direction of the dumping operation. In the embodiment, the lowering operation includes lowering the front-end part of the dump body 2.

The dump body 2 is adjusted to a dumping posture and a loading posture through the dumping operation and the lowering operation. Here, the dumping posture is a posture in which the dump body 2 is raised. The loading posture is a posture in which the dump body 2 is lowered. In the example illustrated in the drawing, the dump body 2 taking the loading posture is illustrated.

For example, when dumping work is performed, the dump body 2 performs the dumping operation such that the loading posture changes to the dumping posture. When luggage is loaded on the dump body 2, the luggage is discharged rearward from the rear end part of the dump body 2 through the dumping operation. On the other hand, when loading work is performed, the dump body 2 is adjusted to the loading posture.

The dump body 2 includes a protector 5 that protects a cab 6 from above. The protector 5 is disposed to cover the cab 6 from above when the dump body 2 takes the loading posture. The protector 5 is provided at the front end of the dump body 2. The protector 5 is disposed above the cab 6. The protector 5 extends in the vehicle width direction. The cab 6 is disposed on the left side with respect to the center in the vehicle width direction.

The cab 6 is supported on a platform 7. The platform 7 is provided to secure a foothold for an operator when entering and alighting from the cab 6. The platform 7 is provided to secure a foothold at the time of maintenance of devices mounted in the dump truck 1. For example, a resistor (not illustrated) may be disposed in the platform 7. The platform 7 is disposed below the protector 5. The platform 7 is disposed above vehicle wheels 11 and 12. The platform 7 extends in the vehicle width direction. The platform 7 is formed in a plate shape parallel to the vehicle longitudinal direction and the vehicle width direction.

Figure 3:
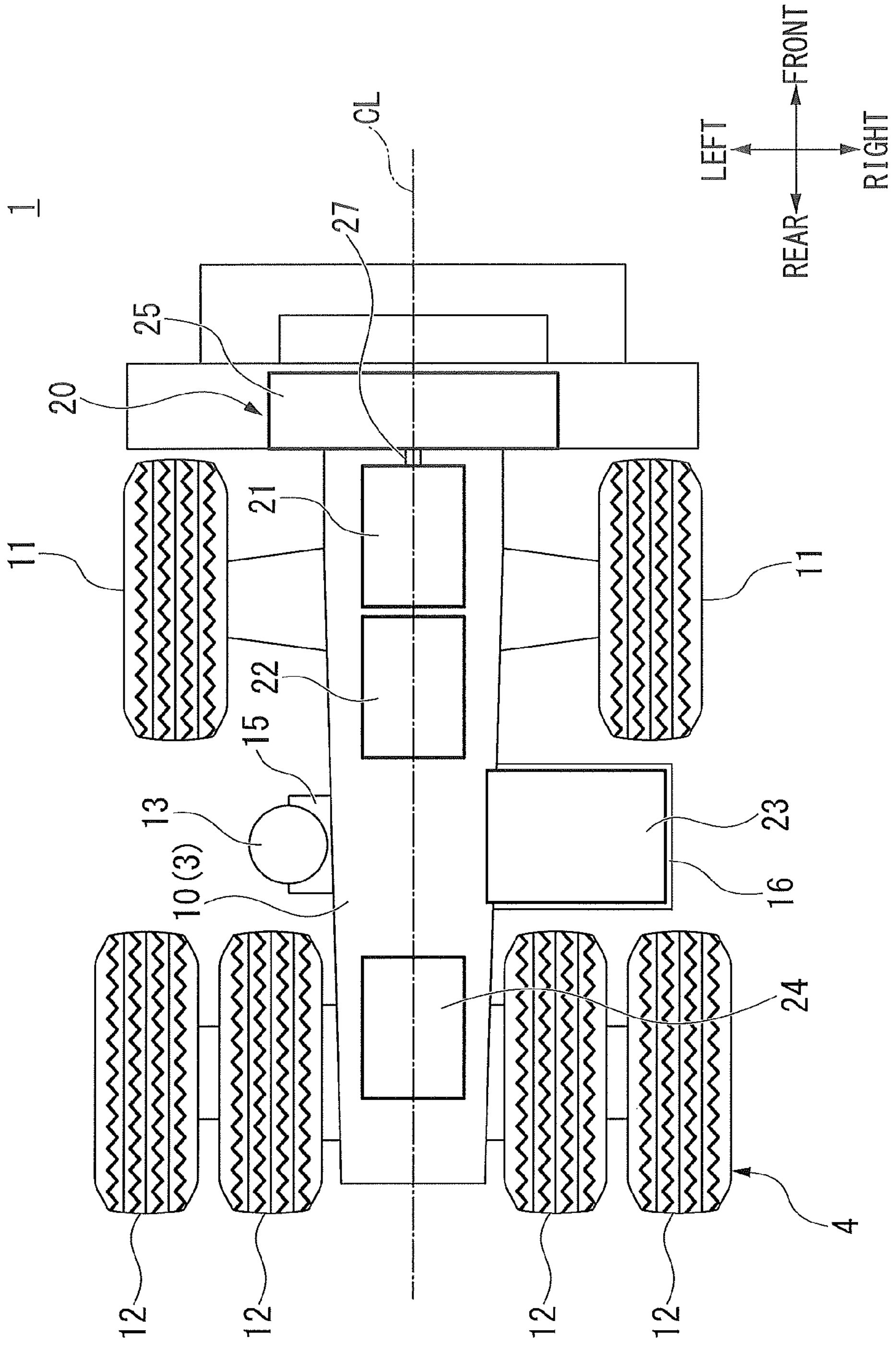
FIG. 3 is a top view of the work vehicle according to the embodiment.

As illustrated in FIG. 3, the vehicle body 3 includes a vehicle body frame 10. The vehicle body frame 10 extends in the vehicle longitudinal direction. As illustrated in FIG. 1, the vehicle body 3 supports the dump body 2. The vehicle body 3 is supported by the undercarriage 4.

The undercarriage 4 supports the vehicle body 3. The undercarriage 4 allows the dump truck 1 to travel. The undercarriage 4 causes the dump truck 1 to move forward or reversely. At least a part of the undercarriage 4 is disposed below the vehicle body 3. The undercarriage 4 includes a plurality of vehicle wheels 11 and 12. The plurality of vehicle wheels 11 and 12 include front wheels 11 and rear wheels 12 disposed behind the front wheels 11.

The front wheels 11 are turning wheels that are steered to change a movement direction of the dump truck 1. The front wheels 11 are disposed as a pair on the left and right sides. As illustrated in FIG. 3, a pair of front wheels 11 on the left and right sides are disposed with a gap therebetween in the vehicle width direction via a front part of the vehicle body frame 10. The front wheels 11 are provided on the left and right sides (a total of two wheels).

The rear wheels 12 are driving wheels that are driven by a traveling driving motor (not illustrated). The rear wheels 12 are provided as a pair. The left and right-rear wheels 12 are disposed with a gap therebetween in the vehicle width direction in which the rear part of the vehicle body frame 10 interposed. Two rear wheels 12 are provided for each of the left and right sides (a total of four rear wheels).

The dump truck 1 includes a hydraulic oil tank 13 in which hydraulic oil is stored. In the top view illustrated in FIG. 3, the hydraulic oil tank 13 has a circular shape. The hydraulic oil tank 13 is supported by the vehicle body frame 10 with a first bracket 15 interposed therebetween. The hydraulic oil tank 13 is connected to a hydraulic pump (not illustrated).

<Fuel Cell System>

Figure 2:
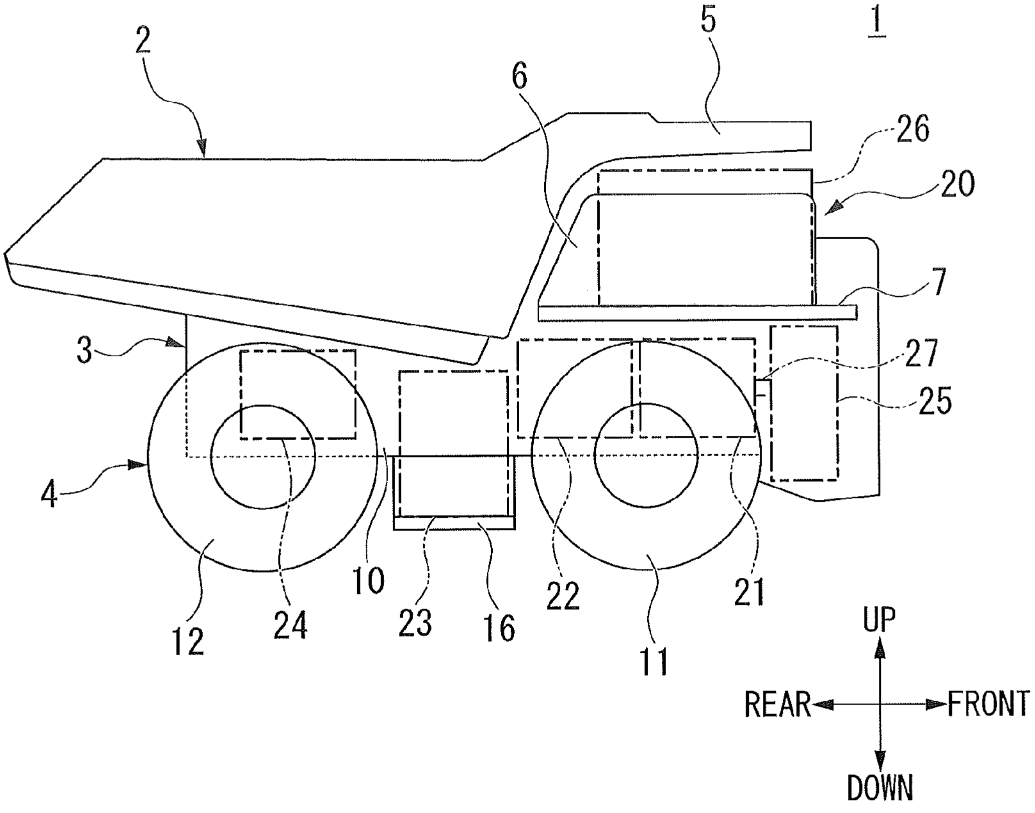
FIG. 2 is a side view of the work vehicle according to the embodiment.

As illustrated in FIG. 2, a fuel cell system 20 is mounted in the dump truck 1. In the example illustrated in FIG. 2, constituents of the fuel cell system 20 are indicated by two-dot dashed lines. The fuel cell system 20 includes a fuel cell 21, a fuel-cell DCDC converter 22, a battery 23, a battery DCDC converter 24, a cooling device 25, and a hydrogen tank 26. The fuel cell 21, the fuel-cell DCDC converter 22, the battery 23, the battery DCDC converter 24, the cooling device 25, and the hydrogen tank 26 are supported by the vehicle body 3.

The fuel cell 21 generates electric power by causing hydrogen which is a fuel gas and oxygen which is an oxidizing gas to react chemically. The fuel cell 21 has a stacked structure in which a plurality of unit cells are stacked. In the side view illustrated in FIG. 2, the appearance of the fuel cell 21 is rectangular. For example, the fuel cell 21 generates electric power using oxygen included in outside air. The fuel cell 21 may be supplied with air including hydrogen from an oxidizing gas supply device (not illustrated).

The fuel-cell DCDC converter 22 adjusts a voltage that is output from the fuel cell 21. The fuel-cell DCDC converter 22 is electrically connected to the fuel cell 21. In the side view illustrated in FIG. 2, the appearance of the fuel-cell DCDC converter 22 is rectangular. For example, the fuel-cell DCDC converter 22 steps up the voltage generated by the fuel cell 21. The fuel-cell DCDC converter 22 supplies direct current generated by the fuel cell 21 to a motor inverter (not illustrated).

The motor inverter converts a direct current from the fuel-cell DCDC converter 22 to a three-phase alternating current and supplies the three-phase alternating current to motors (for example, a pump driving motor and a traveling driving motor which are not illustrated). Each of the pump driving motor and the traveling driving motor is driven on the basis of the three-phase alternating current supplied from the motor inverter.

The pump driving motor drives a hydraulic pump (not illustrated). A hydraulic oil discharged from the hydraulic pump is supplied to a steering cylinder (not illustrated) and a hoist cylinder (not illustrated). The steering cylinder generates power for steering the front wheels 11. The hoist cylinder generates power for performing a dumping operation or a lowering operation of the dump body 2. The traveling driving motor is connected to the rear wheels 12 of the undercarriage 4. A rotational force generated by the traveling driving motor is transmitted to the rear wheels 12 of the undercarriage 4.

The battery 23 stores electric power generated by the fuel cell 21. The battery 23 serves as a power source of the dump truck 1 similarly to the fuel cell 21. The battery 23 supplies its stored electric power to the motors (for example, the pump driving motor and the traveling driving motor). For example, the battery 23 is a secondary battery such as a lithium-ion battery. The battery 23 is supported by the vehicle body frame 10 with a second bracket 16 interposed therebetween. For example, the battery 23 is heavier than the fuel cell 21. In the side view illustrated in FIG. 2, the appearance of the battery 23 has a rectangular shape which is vertically longer than the fuel cell 21.

For example, the battery 23 drives the traveling driving motor when the dump truck 1 is started under the control of a control device (not illustrated). For example, the battery 23 stores regenerative electric power at the time of decelerating regeneration of the dump truck 1. For example, the battery 23 is charged with electric power supplied from the fuel cell 21 according to a load.

The battery DCDC converter 24 adjusts a voltage that is output from the battery 23. The battery DCDC converter 24 is electrically connected to the battery 23. In the side view illustrated in FIG. 2, the appearance of the battery DCDC converter 24 is rectangular. For example, the battery DCDC converter 24 steps up a voltage generated by the battery 23. The battery DCDC converter 24 controls charging and discharging of the battery 23 such that the battery 23 can supply electric power to the motor inverter in cooperation with the fuel cell 21.

For example, the battery 23 may serve as a main power source of the dump truck 1, and the fuel cell 21 serve to charge the battery 23. Accordingly, it is possible to curb a mounting weight of the fuel cell 21. By curbing the mounting weight of the fuel cell 21, it is possible to easily control the fuel cell 21.

The cooling device 25 cools the fuel cell 21. For example, the cooling device 25 supplies a refrigerant (for example, a coolant) to the fuel cell 21 to cool the fuel cell 21. The cooling device 25 is connected to the fuel cell 21 via a cooling pipe 27 in which the refrigerant flows. In the side view illustrated in FIG. 2, the appearance of the cooling device 25 has a rectangular shape which is vertically longer than the fuel cell 21. For example, the cooling device 25 may include a blower for supplying oxygen in the air to the fuel cell 21.

The hydrogen tank 26 stores hydrogen to be supplied to the fuel cell 21. In the side view illustrated in FIG. 2, the hydrogen tank 26 has a rectangular shape which is longitudinally long. For example, the fuel cell 21 is supplied with hydrogen in the hydrogen tank 26 by a hydrogen supply device which is not illustrated. The fuel cell 21 generates electric power by causing hydrogen supplied from the hydrogen supply device and oxygen included in the outside air to react electrochemically.

<Layout of Elements of Fuel Cell System>

The cooling device 25 needs to take in outside air and thus is disposed on a vehicle-body foremost side out of the elements of the fuel cell system 20. The cooling device 25 is disposed in the vehicle body in front of the fuel cell 21. The cooling device 25 is disposed in the vicinity of the fuel cell 21. The cooling pipe 27 extends from the rear part of the cooling device 25 to the fuel cell 21. At least a part of the vertical range of the cooling device 25 is disposed below the platform 7.

The fuel cell 21 is disposed in the vehicle body in front of the fuel-cell DCDC converter 22, the battery 23, and the battery DCDC converter 24. The fuel-cell DCDC converter 22, the battery 23, and the battery DCDC converter 24 are disposed on the vehicle-body central side and the vehicle-body rearward side. The cooling device 25, the fuel cell 21, the fuel-cell DCDC converter 22, the battery 23, and the battery DCDC converter 24 are sequentially arranged from the vehicle-body forward side to the vehicle-body rearward side.

In the top view illustrated in FIG. 3, the cooling device 25, the fuel cell 21, the fuel-cell DCDC converter 22, and the battery DCDC converter 24 are disposed on a vehicle-body lateral center line CL. For example, the cooling device 25, the fuel cell 21, the fuel-cell DCDC converter 22, and the battery DCDC converter 24 are preferably disposed such that center positions thereof overlap the vehicle-body lateral center line CL. Accordingly, it is possible to enhance a weight balance in the vehicle width direction.

In FIG. 3, the dump body 2, the hydrogen tank 26, and the like are not illustrated. As illustrated in FIG. 2, the hydrogen tank 26 is mounted on the platform 7. The hydrogen tank 26 is disposed on the right side of the cab 6 (see FIG. 1) on the top surface of the platform 7. The hydrogen tank 26 is disposed between the platform 7 and the protector 5.

In the top view illustrated in FIG. 3, the battery 23 and the hydraulic oil tank 13 are disposed on the opposite sides in the vehicle-body lateral direction. In this embodiment, the hydraulic oil tank 13 is disposed on the left side of the vehicle-body lateral center line CL. On the other hand, the battery 23 is disposed on the right side of the vehicle-body lateral center line CL. In the top view, the battery 23 is disposed between the right-front wheel 11 and the right-rear wheel 12. In the side view illustrated in FIG. 2, the battery 23 is disposed in a space surrounded by the right-front wheel 11, the right-rear wheel 12, and the right-lower portion of the dump body 2.

In the top view illustrated in FIG. 3, the cooling device 25 is symmetric with respect to the vehicle-body lateral center line CL. In the top view illustrated in FIG. 3, the cooling device 25 has a rectangular shape that is long in the vehicle width direction. The length in the vehicle width direction of the cooling device 25 is longer than the length in the vehicle width direction of the fuel cell 21. The fuel cell 21, the fuel-cell DCDC converter 22, and the battery DCDC converter 24 are substantially the same in the length in the vehicle width direction. In the top view illustrated in FIG. 3, the fuel cell 21, the fuel-cell DCDC converter 22, and the battery DCDC converter 24 have rectangular shapes. The fuel cell 21, the fuel-cell DCDC converter 22, and the battery DCDC converter 24 are disposed in the range in the vehicle width direction of the cooling device 25.

The fuel cell 21, the fuel-cell DCDC converter 22, and the battery DCDC converter 24 are mounted on the vehicle body frame 10. The fuel cell 21, the fuel-cell DCDC converter 22, and the battery DCDC converter 24 are disposed in the range in the vehicle width direction of the vehicle body frame 10. Accordingly, the fuel cell 21, the fuel-cell DCDC converter 22, and the battery DCDC converter 24 are covered by the vehicle body frame 10 from below the vehicle body. As a result, it is possible to curb disturbance (for example, scattering stone) of the fuel cell 21, the fuel-cell DCDC converter 22, and the battery DCDC converter 24 from below the vehicle body.

As illustrated in FIG. 2, the cooling device 25, the fuel cell 21, the fuel-cell DCDC converter 22, and the battery 23 are disposed below the platform 7. In the side view illustrated in FIG. 2, the fuel cell 21 and the fuel-cell DCDC converter 22 overlap the front wheels 11. In the side view illustrated in FIG. 2, the fuel cell 21 overlaps the front-upper portion of the front wheels 11. In the side view illustrated in FIG. 2, the fuel-cell DCDC converter 22 overlaps the rear-upper portion of the front wheels 11. For example, in the side view illustrated in FIG. 2, the fuel cell 21 and the fuel-cell DCDC converter 22 are preferably disposed in the range in the vehicle longitudinal direction of the front wheels 11.

For example, in the side view illustrated in FIG. 2, the whole portion of the fuel cell 21 and the fuel-cell DCDC converter 22 is more preferably disposed inside of the front wheels 11 in the radial direction thereof from the outer circumferential edge of the front wheels 11. Accordingly, since the fuel cell 21 and the fuel-cell DCDC converter 22 are covered by the front wheels 11, it is possible to curb disturbance (for example, scattering stone) on the fuel cell 21 and the fuel-cell DCDC converter 22 from the outside in the vehicle width direction.

As illustrated in FIG. 2, the battery 23 is disposed between the dump body 2 and the second bracket 16. In the top view illustrated in FIG. 3, the appearance of the battery 23 has a rectangular shape which is longer in the vehicle width direction than the fuel cell 21. In the top view illustrated in FIG. 3, the battery 23 is disposed inside of the right end of the right-front wheel 11 in the vehicle width direction. In the top view illustrated in FIG. 3, the battery 23 is disposed inside in the vehicle width direction of the right end of the right-rear wheel 12 (specifically, inside of the right-rear wheel 12 on the outside in the vehicle width direction out of a pair of right-rear wheels 12).

For example, in the top view, the battery 23 is preferably disposed in the range in the vehicle width direction of the dump body 2. For example, the whole portion of the battery 23 is more preferably disposed inside of the outer end of the dump body 2 in the vehicle width direction. Accordingly, since the battery 23 is covered by the dump body 2 from above the vehicle, it is possible to curb disturbance (for example, rain droplets) of the battery 23 from above the vehicle.

As illustrated in FIG. 2, the battery DCDC converter 24 is disposed between the dump body 2 and the vehicle body frame 10. In the side view illustrated in FIG. 2, the battery DCDC converter 24 overlaps the upper portion of the rear wheels 12. For example, in the side view illustrated in FIG. 2, the battery DCDC converter 24 is preferably disposed in the range in the vehicle longitudinal direction of the rear wheels 12.

For example, in the side view illustrated in FIG. 2, the whole portion of the battery DCDC converter 24 is preferably disposed inside of the rear wheels 12 in the radial direction from the outer circumferential edge of the rear wheels 12. Accordingly, since the battery DCDC converter 24 is covered by the rear wheels 12 from the outside in the vehicle width direction, it is possible to curb disturbance (for example, scattering stone) of the battery DCDC converter 24 from the outside in the vehicle width direction.

Operations and Advantages

As described above, the dump truck 1 according to this embodiment includes the fuel cell 21, the fuel-cell DCDC converter 22 that adjusts the voltage output from the fuel cell 21, the battery 23, the battery DCDC converter 24 that adjusts the voltage output from the battery 23, and the vehicle body 3 that supports the fuel cell 21, the fuel-cell DCDC converter 22, the battery 23, and the battery DCDC converter 24. The fuel cell 21 is disposed in the vehicle body in front of the fuel-cell DCDC converter 22, the battery 23, and the battery DCDC converter 24.

With this configuration, since the fuel cell 21 is disposed in the vehicle body in front of the fuel-cell DCDC converter 22, the battery 23, and the battery DCDC converter 24, it is possible to curb concentration of weight in the front (the weight of the front in an unloaded state being excessively large) in comparison with a case in which the heavy battery 23 is disposed in the vehicle body in front of the fuel cell 21. Accordingly, it is possible to curb deterioration of a longitudinal weight balance in an unloaded state.

In addition, by curbing concentration of weight in the front, it is possible to curb a decrease in traction of the rear wheels 12 which are driving wheels. Accordingly, it is possible to curb deterioration of hill-climbing performance on a soft road surface at the time of raining or the like.

In this embodiment, the fuel-cell DCDC converter 22, the battery 23, and the battery DCDC converter 24 are disposed in the vehicle-body central side and the vehicle-body rearward side.

With this configuration, in comparison with a case in which the battery 23 and the DCDC converter which are heavy are disposed in the vehicle-body forward side, it is possible to curb concentration of weight in the front. Accordingly, it is possible to more effectively curb deterioration of the longitudinal weight balance in an unloaded state.

In this embodiment, the dump truck 1 further includes the cooling device 25 that cools the fuel cell 21. The cooling device 25 is disposed in the vehicle body in front of the fuel cell 21.

With this configuration, in comparison with a case in which the cooling device 25 is disposed in the vehicle body behind the fuel cell 21, it is possible to easily take in outside air. For example, when the dump truck 1 moves forward, it is possible to directly take in the outside air (for example, travel wind) into the cooling device 25 from the forward side of the vehicle.

In this embodiment, the cooling device 25 is disposed in the vicinity of the fuel cell 21.

With this configuration, it is possible to maximally shorten the length of a pipe connecting the cooling device 25 to the fuel cell 21. For example, when the cooling device 25 is connected to the fuel cell 21 via the cooling pipe 27, it is possible to make the length of the cooling pipe 27 as short as possible by causing the cooling pipe 27 to extend from the rear portion of the cooling device 25 to the fuel cell 21.

By shortening the length of the cooling pipe 27, it is possible to easily mount the cooling pipe 27 on the vehicle body 3. In addition, by shortening the length of the cooling pipe 27, it is possible to decrease the weight of the cooling pipe 27. In addition, by shortening the length of the cooling pipe 27, it is possible to decrease the amount of refrigerant passing through the cooling pipe 27 and to decrease maintenance costs.

In this embodiment, the cooling device 25, the fuel cell 21, the fuel-cell DCDC converter 22, the battery 23, and the battery DCDC converter 24 are sequentially disposed from the vehicle-body forward side to the vehicle-body rearward side.

With this configuration, since the battery 23 and the DCDC converter which are heavy are disposed in the vehicle body behind the cooling device 25 and the fuel cell 21, it is possible to curb concentration of weight in the front. Accordingly, it is possible to more effectively curb deterioration of a longitudinal weight balance in an unloaded state.

In this embodiment, the dump truck 1 further includes the hydrogen tank 26 that stores hydrogen to be supplied to the fuel cell 21, the protector 5 that protects the cab 6 from above the vehicle body, and the platform 7 that is disposed in the vehicle body below the protector 5. The hydrogen tank 26 is mounted on the platform 7.

With this configuration, it is possible to mount the hydrogen tank 26 with a large capacity using the vehicle height direction up to the vicinity of the protector 5. By mounting the hydrogen tank 26 which is light on the platform 7, the strength required for the platform 7 may be less in comparison with a case in which the battery 23 and the DCDC converter which are heavy are mounted on the platform 7. Since less shields are provided above the platform 7, it is possible to reduce a risk of collection of hydrogen in the shields when hydrogen is discharged from the hydrogen tank 26.

In this embodiment, the dump truck 1 further includes the hydraulic oil tank 13 that stores a hydraulic oil. The battery 23 and the hydraulic oil tank 13 are disposed on the opposite sides in the vehicle-body lateral direction.

With this configuration, in comparison with a case in which the battery 23 and the hydraulic oil tank 13 are disposed on the same side in the vehicle-body lateral direction, it is possible to curb deterioration of a lateral weight balance in an unloaded state.

Other Embodiments

In the aforementioned embodiment, the fuel-cell DCDC converter, the battery, and the battery DCDC converter are disposed on the vehicle-body central side and the vehicle-body rearward side, but the present invention is not limited thereto. For example, the battery and the DCDC converter may be disposed on the vehicle-body forward side. For example, the layout of the fuel-cell DCDC converter, the battery, and the battery DCDC converter can be changed according to required specifications.

In the aforementioned embodiment, the dump truck further includes the cooling device that cools the fuel cell and the cooling device is disposed in the vehicle body in front of the fuel cell, but the present invention is not limited thereto. For example, the cooling device may be disposed in the vehicle body behind the fuel cell. For example, the dump truck may not include the cooling device. For example, the layout of the cooling device can be changed according to required specifications.

In the aforementioned embodiment, the cooling device is disposed in the vicinity of the fuel cell, but the present invention is not limited thereto. For example, the cooling device may not be disposed in the vicinity of the fuel cell. For example, the cooling device may be disposed closer to the battery than the fuel cell. For example, the layout of the cooling device and the fuel battery (an interval between the cooling device and the fuel cell) can be changed according to required specifications.

In the aforementioned embodiment, the cooling device, the fuel cell, the fuel-cell DCDC converter, the battery, and the battery DCDC converter are sequentially disposed from the vehicle-body forward side to the vehicle-body rearward side, but the present invention is not limited thereto. For example, the cooling device, the fuel cell, the fuel-cell DCDC converter, the battery, and the battery DCDC converter may not be sequentially disposed from the vehicle-body forward side to the vehicle-body rearward side. For example, the layout order of the fuel-cell DCDC converter, the battery, and the battery DCDC converter may be reverse. For example, the layout of the cooling device, the fuel cell, the fuel-cell DCDC converter, the battery, and the battery DCDC converter can be changed according to required specifications.

In the aforementioned embodiment, the dump truck further includes the hydrogen tank that stores hydrogen to be supplied to the fuel cell, the protector that protects the cab from above the vehicle body, and the platform that is disposed below the vehicle body in comparison with the protector and the hydrogen tank is mounted on the platform, but the present invention is not limited thereto. For example, the hydrogen tank may not be mounted on the platform. For example, the hydrogen tank may be mounted under the platform. For example, the hydrogen tank may be mounted on the vehicle body frame. For example, the mounting layout of the hydrogen tank can be changed according to required specifications.

In the aforementioned embodiment, the dump truck further includes the hydraulic oil tank that stores hydraulic oil and the battery and the hydraulic oil tank are disposed on opposite sides in the vehicle-body lateral direction, but the present invention is not limited thereto. For example, the battery and the hydraulic oil tank may be disposed on the same side in the vehicle-body lateral direction. For example, the layout of the battery and the hydraulic oil tank can be changed according to required specifications.

In the aforementioned embodiment, the dump truck has been described above as an example of a work machine (a work vehicle), but the present invention is not limited thereto. For example, the present invention can be applied to other work vehicles such as an excavator, a bulldozer, and a wheel loader.

While embodiments of the present invention have been described above, the present invention is not limited thereto and can be subjected to additions, omissions, substitutions, and other modifications of constituent elements without departing from the gist of the present invention, and the aforementioned embodiments can also be appropriately combined.

BRIEF DESCRIPTION OF THE REFERENCE SYMBOLS

1 . . . Dump truck (work vehicle)
3 . . . Vehicle body
5 . . . Protector
7 . . . Platform
13 . . . Hydraulic oil tank
21 . . . Fuel cell
22 . . . Fuel-cell DCDC converter
23 . . . Battery
24 . . . Battery DCDC converter
25 . . . Cooling device
26 . . . Hydrogen tank

The invention claimed is:

1. A dump truck comprising:

a fuel cell;

a fuel-cell DCDC converter that adjusts a voltage output from the fuel cell;

a battery;

a battery DCDC converter that adjusts a voltage output from the battery;

a vehicle body that supports the fuel cell, the fuel-cell DCDC converter, the battery, and the battery DCDC converter;

a dump body that at least a part of the dump body is disposed above the vehicle body; and an undercarriage that supports the vehicle body, wherein the fuel cell is disposed in the vehicle body in front of the fuel-cell DCDC converter, the battery, and the battery DCDC converter, wherein a cooling device is disposed in the vehicle body in front of the fuel cell, wherein the cooling device, the fuel cell, the fuel-cell DCDC converter, the battery, and the battery DCDC converter are sequentially disposed from a vehicle-body forward side to a vehicle-body rearward side.

2. The dump truck according to claim 1, wherein the fuel-cell DCDC converter, the battery, and the battery DCDC converter are disposed in a vehicle-body central side and a vehicle-body rearward side.

3. The dump truck according to claim 1, wherein the cooling device is disposed in the vicinity of the fuel cell.

4. The dump truck according to claim 1, further comprising:

a hydrogen tank that stores hydrogen to be supplied to the fuel cell;

a protector that protects a cab from above the vehicle body; and a platform that is disposed in the vehicle body below the protector, wherein the hydrogen tank is mounted on the platform.

5. The dump truck according to claim 1, further comprising a hydraulic oil tank that stores a hydraulic oil, wherein the battery and the hydraulic oil tank are disposed on the opposite sides in a vehicle-body lateral direction.

* * * * *